No. 804,790. PATENTED NOV. 14, 1905.
A. J. BERG.
CAR FENDER.
APPLICATION FILED JULY 12, 1905.
2 SHEETS—SHEET 1.
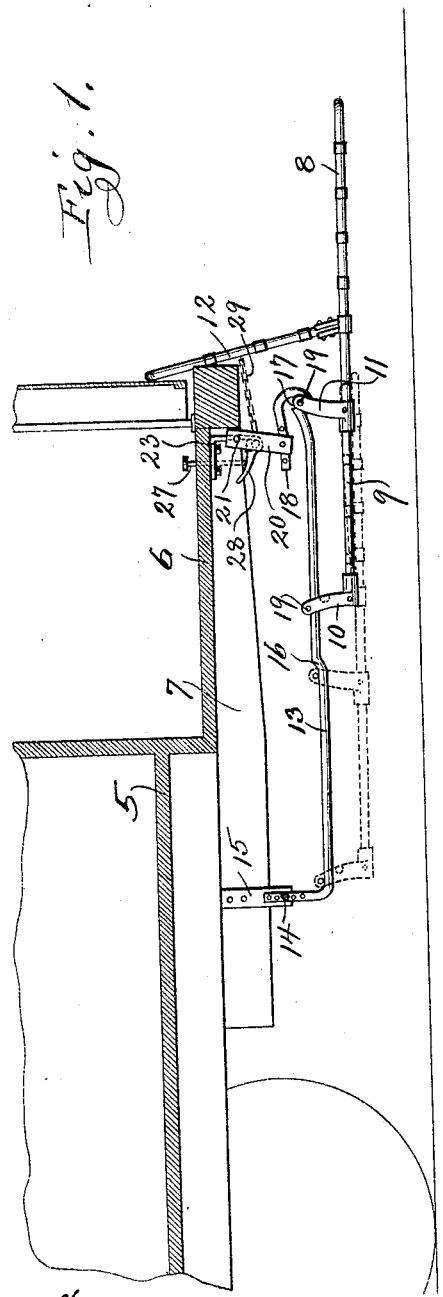
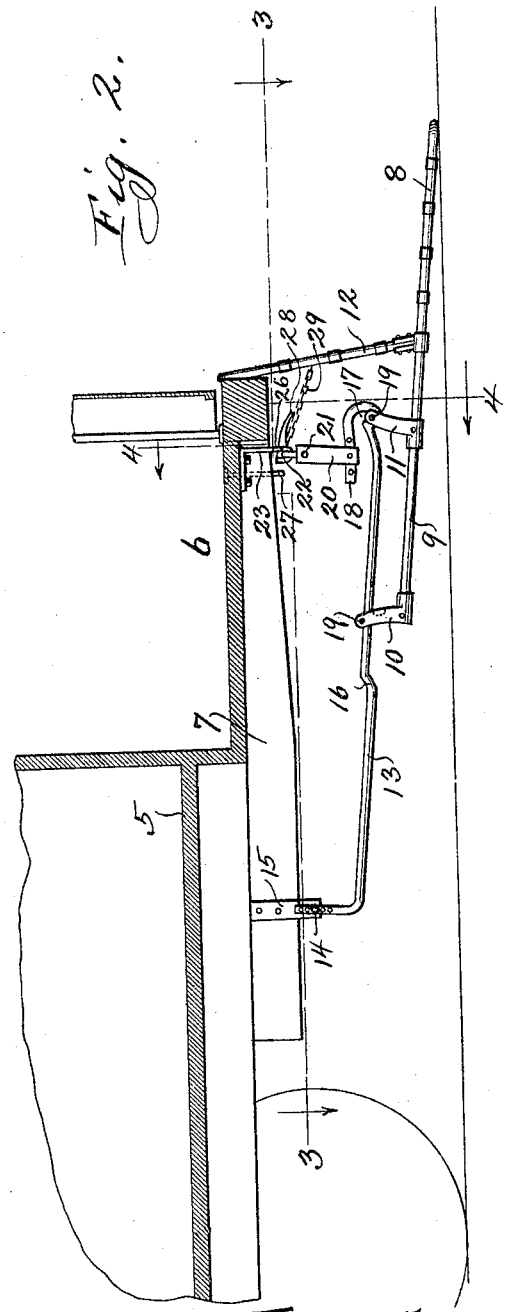
Witnesses:
Fred J. Schad.
Edna C. Gelt.
Inventor:
August J. Berg.
By R. J. Jacker
Atty No. 804,790. PATENTED NOV. 14, 1905.
A. J. BERG.
CAR FENDER.
APPLICATION FILED JULY 12, 1905.
2 SHEETS—SHEET 2.
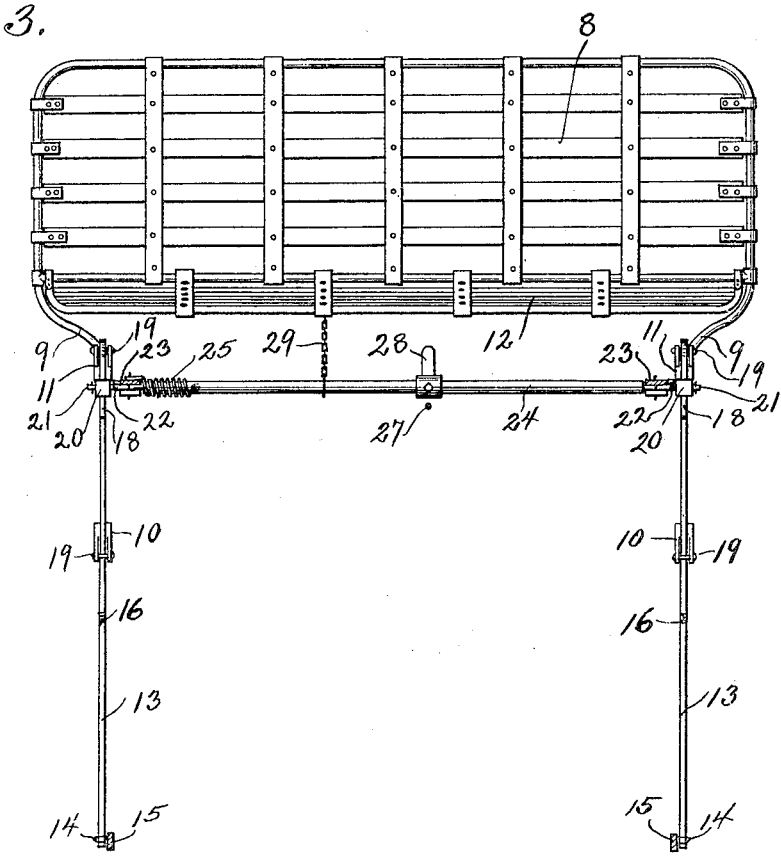
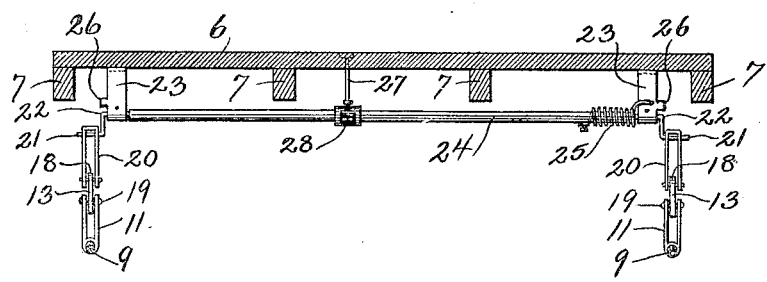
Witnesses:
Fred J. Schad.
Edna C. Gelk.
Inventor:
August J. Berg.
By K. J. Jaekler
Atty.

UNITED STATES PATENT OFFICE.

AUGUST J. BERG, OF CHICAGO, ILLINOIS.

CAR-FENDER.

No. 804,790.　　　Specification of Letters Patent.　　　Patented Nov. 14, 1905.

Application filed July 12, 1905. Serial No. 270,152.

*To all whom it may concern:*

Be it known that I, AUGUST J. BERG, a citizen of the United States, residing at Chicago, in the county of Cook and State of Illinois, have invented a new and useful Car-Fender, of which the following is a specification.

My invention relates to car-fenders which can be folded and placed out of the way when not in use; and the objects of my improvements are, first, to provide a fender which can easily and quickly be adjusted into position; second, to arrange means for locking the fender in its extended position and means for locking the fender in its retracted position; third, to provide mechanism for normally holding the fender up from the ground and means for quickly dropping the same; fourth, to make a simple, cheap, and durable device, and other objects to become apparent from the description to follow. In car-fenders of this class it is very desirable to normally have the fender some distance above the ground whenever desired. It is an advantage to have the mechanism so constructed that it requires very little effort on the part of the operator to cause the fender to drop. Another advantage is to have the fender locked in its forward or extended position and in its backward or folded position, so that it will not move from either of said positions accidentally. All of these advantages are attained by the use of my invention, which consists of a fender provided with four hangers, two on either side, which are arranged to travel on two carrier-bars, one on either side, which are secured to the under side of the car, the rear end of each carrier-bar being pivotally secured and the forward end of each bar being connected to mechanism for simultaneously lowering both bars when said mechanism is set in action by the operator, and an apron which is hinged to the fender and rests back against the front of the car.

To describe my invention so that others versed in the art to which it pertains will understand it sufficiently to make and use the same, I have illustrated it on the accompanying two sheets of drawings, forming a part of this specification, in which—

Figure 1 is a fragmental longitudinal sectional view of a car having a fender embodying my invention. Fig. 2 is a similar view with the fender in a lowered position. Fig. 3 is a plan section on line 3 3 of Fig. 2, and Fig. 4 is a vertical section on line 4 4 of Fig. 2.

Similar reference characters refer to similar parts throughout the several views.

The car 5 is of any ordinary construction. 6 is the car-platform, and 7 represents the timbers under the platform.

The fender 8 is preferably constructed of a tubular frame and wooden slats secured in said frame. The two end tubes of the fender-frame extend back underneath the car some distance, forming the supporting-arms 9. Each arm 9 has secured to it two hanger-brackets 10 (which is secured at the end of said arm) and 11, (which is located about midway between the bracket 10 and the fender 8.) An apron 12 is pivotally secured to the fender 8, arranged to rest in an upright position against the front end of the car when the fender is in use to prevent the object picked up by the fender from lodging under the car. The fender 8 and apron 12 are entirely supported in position by the brackets 10 and 11, which are arranged to slide on the carrier-bar 13. The bar 13 is of such length that the fender can be moved from its foremost position in front of the car to its rearward position underneath the car. Its rear end is pivotally secured at 14 to a bracket 15, secured to the under side of the car, and its forward end is connected to 9 and supported by a trip mechanism.

While I will describe the carrier-bar and its attachments in a singular sense, it will be understood that there are two such bars, one near either side of the car.

The rear end of the bar 13 is bent up where it is secured to the bracket 15, which serves to always retain the bar 13 right side up. This rear end of the bar 13 is preferably provided with a plurality of perforations or bolt-holes to enable the adjustment of the fender when it is secured to the car. About midway its length the bar 13 is bent to form an offset 15, inclining upward from back to front, and the front end of said bar is bent up and back over itself in such manner as to form the depression 17 and the overhanging free end 18. The bar 13 serves as a track for the brackets 10 11 to slide on, there being a pin or bolt 19 through the forked portion of each bracket above the bar 13. Greater weight being to the front of bracket 11 than there is to the rear of same, the pull will be down on the bracket 11 and up on the bracket 10. This will assist in retaining the bolt 19 in said bracket securely resting in the socket or depression 17. The bracket 10 is provided with an integral arm or lug just below the bar 13 to prevent it from being lifted and allowing the fender 8 to drop too far down.

In its normal position when in use the fender extends some distance forward of the front end of the car, as shown by full lines in Fig. 1, and when the fender is not in use (as when the car is traveling in the opposite direction or is coupled to another car) it is pushed to a position under the car, as shown by the dotted lines in Fig. 1. When the fender 8 is in its operative or forward position, as shown in full lines in Fig. 1, it is supported entirely by the carrier-bars 13 and about eight inches above the ground.

The fender is arranged to be dropped at will by mechanism to be described, and I am not aware that a fender has been made previous to my invention which was supported by carrier-bars pivoted at their rear ends and mechanism connected to their front ends for supporting and dropping them simultaneously, and I therefore make claim to such a device broadly, no matter what the construction is of the mechanism for supporting and lowering the front ends of the carrier-bars.

It will be understood, of course, that when the front ends of the carrier-bars 13 are lowered the fender 8 will be lowered. It is important that this lowering of the fender can be accomplished quickly and with very little physical exertion on the part of the operator of the car, and to this end I have arranged that the gravitating force of the fender acts as the power to lower the same after it has been released by the operation of a tripping mechanism. This can be accomplished in a number of ways, which will suggest themselves to the mind of an ordinary mechanic; but I have shown and will describe a construction which at present I consider the best for the purpose.

The free end 18 of the bar 13 is preferably provided with a plurality of holes, one of which serves to receive a pin or bolt on which the lower end of a yoke or U-shaped link 20 is pivoted, the upper end of said link 20 being provided with a perforation through which loosely extends the crank 21 of the crank-shaft 22. The one shaft 22 serves to operate both carrier-bars 13, there being a crank 21 on either end of said shaft 22. The shaft 22 is journaled near either end in the hook-shaped ends of the strap-irons 23, which are bolted to the under side of the car-platform 6, a pin being passed through said hook-shaped ends just above the shaft, as shown in Figs. 3 and 4, to prevent the shaft from accidentally being lifted or jolted out of its bearing. The shaft 22 is preferably made of two separate pieces rigidly secured together by inserting them into an iron pipe 24 and riveting through pipe and shafts, the pipe conveniently serving to limit the end play of the shaft by its ends resting against the strap-irons 23.

From the description thus far given it will be seen that when the cranks 21 are in their upper position, as shown in Fig. 1, the fender 8 is up some distance above the ground and when the cranks 21 are in their lower position, as shown in Figs. 2, 3, and 4, the fender 8 is contacting with the ground, the fender and the bars 13 pivoting about the points 14 in moving from the one position into the other. The normal position of the cranks 21 is above the shaft 22 substantially on a dead-center with respect to the pull exerted on said cranks by the gravitating force of the fender 8, bars 13, and the connections. To bring the fender into its normal raised position, the front end of the fender is lifted by manual force. This relieves the cranks 21 from all downward pull, and the shaft 22 is immediately revolved about a half-revolution by the coiled spring 25, which encircles the pipe 24 and has one end secured to said pipe and the remaining end secured to a fixed part of the car, which may conveniently be one of the strap-irons 23, to bring the cranks 21 above the shaft 22. The shaft 22 is limited in its revolution caused by the spring 25 by the radial portion of the cranks 21 contacting with an extension 26 on the strap-irons 23. (Clearly shown in Fig. 4. The tension of the spring 25 is strong enough to revolve the shaft 22 to bring the cranks 21 from their lower position to their upper position when the fender 8 is lifted, but is too weak to prevent the shaft from being turned by the weight of the fender to bring the cranks 21 from their upper position to their lower position when once the cranks are but slightly moved out of dead-center away from the extensions 26. It requires very little power to move the cranks 21 out of dead-center, because the cranks which carry the weight are being moved about in a horizontal line and the tension of the spring 25 is slight.

Any convenient means may be provided whereby the person operating the car can easily move the cranks 21 out of dead-center. I have shown one which may be considered preferable, since it provides a loose pin or bolt 27, which is inserted through a hole in the platform 6 and engages a finger or arm 28, rigidly secured to the pipe 24. The lower end of the pin 27 normally rests on the arm 28, which projects about horizontally from the pipe 24 when the fender is in a raised position, and when the operator depresses the pin 27 with his foot the pipe 24, and therefore the shaft 22, is revolved sufficiently to bring the cranks 21 out of dead-center, whereupon the weight of the fender will continue to revolve the shaft until the cranks 21 are directly below the shaft, as shown in Fig. 2. The pin 27 can be removed by the operator and used on the other end of the car when the direction of travel is reversed, so the fender cannot be lowered by any one except the operator. The pin 27 is provided with a head to prevent it passing entirely through the hole in the platform after an operation.

A chain 29 is connected between the apron 12 and a part secured to the car, which may conveniently be the shaft 22. This automatically lifts the apron and holds it in position when the fender is pulled forward.

When the fender is out of service and pushed back on the bars 13 under the car, as shown by the dotted lines in Fig. 1, the bolt 19 in the bracket 11 passes just back of the offset 16 in the bars 13, which prevents the fender from being jolted forward out of position.

Having thus fully described my invention, what I claim as new, and desire to secure by Letters Patent of the United States, is—

1. In a device of the class described, a fender having its rearward extensions pivotally connected to the car and means comprising a shaft provided with a crank at either end and an arm secured to said shaft arranged to be engaged by a sliding pin extending vertically through the car-platform whereby said shaft will receive its initial movement by depressing said pin, for quickly lowering the forward part of the fender.

2. In a device of the class described, two bars having their rearward ends pivotally secured to the car, a fender arranged to travel forward and back on said arms, and means comprising a shaft provided with a crank at either end for normally holding in a raised position and quickly lowering the forward ends of said arms.

3. In a device of the class described, two rails secured to the car, a fender arranged to travel forward and back on said rails, and an offset in said rails to coöperate with the engaging part of the fender when in its rearward position, whereby the fender is prevented from moving forward until lifted to pass said offset.

4. In a device of the class described, two rails secured to the car, a fender arranged to travel forward and back on said rails, and a depression in the forward end of said rails to coöperate with the engaging part of said fender when in its forward position whereby the fender is prevented from moving back until lifted out of said depression.

5. In a device of the class described, two rails secured to the car, a fender arranged to travel forward and back on said rails, an offset in said rails to coöperate with the engaging part of the fender when in its rearward position, whereby the fender is prevented from moving forward until lifted to pass said offset, and a depression in the forward end of said rails to coöperate with the engaging part of said fender when in its forward position whereby the fender is prevented from moving back until lifted out of said depression.

6. In a device of the class described, two rails having their rearward ends pivotally secured to the car, a fender arranged to travel forward and back on said rails, an offset in said rails to coöperate with the engaging part of said fender when in its rearward position whereby the fender is prevented from moving forward until lifted to pass said offset, and means for normally supporting and quickly lowering the forward ends of said rails.

7. In a device of the class described, two rails having their rearward ends pivotally secured to the car, a fender arranged to travel forward and back on said rails, a depression in the forward end of said rails to coöperate with the engaging part of the fender when in its forward position whereby the fender is prevented from moving back until lifted out of said depression and means for normally supporting and quickly lowering the forward ends of said rails.

8. In a device of the class described, two rails having their rearward ends pivotally secured to the car, a fender arranged to travel forward and back on said rails, an offset in said rails to coöperate with the engaging part of said fender when in its rearward position whereby the fender is prevented from moving forward until lifted to pass said offset, a depression in the forward end of said rails to coöperate with the engaging part of the fender when in its forward position whereby the fender is prevented from moving back until lifted out of said depression, and means for normally supporting and quickly lowering the forward ends of said rails.

9. In a device of the class described, two rails secured to the car, a fender arranged to travel forward and back on said rails, an apron pivoted to said fender and a chain connected between said apron and said car whereby the apron is automatically raised to and held in an upright position when the fender is moved to its forward position.

10. In a device of the class described, a fender having its rear extensions pivotally secured to the car means for moving said fender under the car and means comprising a shaft provided with a crank at either end and links connecting said cranks to said fender for lowering the forward part of said fender.

11. In a device of the class described, a fender having its rearward extensions pivotally secured to the car and means for supporting the forward part of said fender; said means comprising a rock-shaft mounted in bearings secured to the car and provided at either end with a crank and lugs on said bearings to engage said cranks to prevent a complete rotation of said shaft.

12. In a device of the class described, a fender having its rearward extensions pivotally secured to the car and means for lowering the forward part of said fender; said means comprising a rock-shaft mounted in bearings secured to the car and provided at either end with a crank, lugs on said bearings to engage said cranks to prevent a complete rotation of said shaft and links connecting said cranks to said fender.

13. In a device of the class described, a fender having its rearward extensions pivotally secured to the car and means for lowering the forward part of said fender; said means comprising a shaft provided with a crank at either end an arm secured to said shaft arranged to be engaged by a sliding pin extending vertically through the platform whereby said shaft will receive its initial movement by depressing said pin and a spring to normally hold said cranks in an elevated position.

14. In a device of the class described, a fender having its rearward extensions pivotally connected to the car and means for lowering the forward part of said fender; said means comprising a hollow rock-shaft having secured in either end rods bent to form cranks on the exterior of said shaft, bearings secured to the car in which said shaft is mounted, lugs on said bearings to engage said cranks to limit the rotation of said shaft, an arm secured to said shaft arranged to be engaged by a sliding pin extending vertically through the car-platform whereby said shaft will receive its initial movement by depressing said pin and a spring interposed between said shaft and said bearing to normally hold said cranks in engagement with said lugs.

15. In a device of the class described, a fender having its rearward extensions pivotally secured to the car and means for lowering the front part of said fender comprising a rock-shaft provided at either end with a crank connected to one end of a link forming the connection with the fender, an arm secured to said shaft arranged to be engaged by a sliding pin extending through the car-platform whereby said shaft will receive its initial movement by depressing said pin.

16. In a device of the class described, two bars having their rearward ends pivotally connected to the car, a fender arranged to travel forward and back on said bars and means for lowering the forward ends of said bars; said means comprising a shaft provided with a crank at either end and a coiled spring about said shaft to normally hold said cranks in an elevated position.

17. In a device of the class described, two bars having their rearward ends pivotally secured to the car, a fender arranged to travel forward and back on said bars and means whereby the weight of the forward ends of said bars is supported by a part arranged to swing about a center.

18. In a device of the class described, two bars having their rearward ends pivotally secured to the car, a fender arranged to travel forward and back on said bars and means comprising a rock-shaft for lowering the forward ends of said bars.

19. In a device of the class described, two bars having their rearward ends pivotally secured to the car, a fender arranged to travel forward and back on said bars and means comprising a rock-shaft provided with a crank at either end for lowering the front ends of said bars.

20. In a device of the class described, two bars having their rearward ends pivotally secured to the car, a fender arranged to travel forward and back on said bars and means comprising a rock-shaft provided with a crank at either end and means for giving said rock-shaft its initial movement for lowering the forward ends of said bars.

21. In a device of the class described, two bars having their rearward ends pivotally secured to the car, a fender arranged to travel forward and back on said bars and means for lowering the forward ends of said bars comprising a rock-shaft provided at either end with a crank connected to one end of a link forming the connection with the forward ends of said bars, an arm secured to said shaft arranged to be engaged by a sliding pin extending vertically through the car-platform whereby said shaft will receive its initial movement by depressing said pin.

In testimony whereof I have signed my name to this specification, in presence of two subscribing witnesses, this 22d day of June, 1905, at Chicago, Illinois.

AUGUST J. BERG.

Witnesses:
 LOUISE BERG,
 EMIL PETERSON.